United States Patent [19]
Erickson et al.

[11] 3,928,280
[45] Dec. 23, 1975

[54] PREPARATION OF DENTAL RESTORATIVE FILLING MATERIALS

[75] Inventors: Wallace A. Erickson, Chicago; Byoung Suh, Oak Park, both of Ill.

[73] Assignee: Wallace A. Erickson & Company, Chicago, Ill.

[22] Filed: July 5, 1974

[21] Appl. No.: 485,979

Related U.S. Application Data

[63] Continuation-in-part of Ser. No. 231,736, March 3, 1972, abandoned.

[52] U.S. Cl. .............. 260/42.28; 106/35; 117/47; 117/60; 252/477 R; 260/34.2; 260/37; 260/42.15; 260/42.29; 260/DIG. 60
[51] Int. Cl.² .................. C08F 29/50; B08J 11/54
[58] Field of Search............ 117/47, 60; 252/477 R; 106/35; 260/42.28, 34.2, 37, 42.29, 42.15, 837 R, DIG. 36

[56] References Cited
UNITED STATES PATENTS

| | | | |
|---|---|---|---|
| 3,066,112 | 11/1962 | Bowen | 260/42.15 |
| 3,083,118 | 3/1963 | Bridgeford | 117/47 |
| 3,505,428 | 4/1970 | Kidwell et al. | 260/837 R |
| 3,560,408 | 2/1971 | Kiehl et al. | 252/477 R |
| 3,589,853 | 6/1971 | Guasco | 252/477 R |
| 3,652,317 | 3/1972 | Della Porta et al. | 252/477 R |
| 3,746,658 | 7/1973 | Della Porta et al. | 252/477 R |

OTHER PUBLICATIONS

Skinner, The Science of Dental Materials, 4 ed., pp. 148, 183–184, 186.

*Primary Examiner*—Murray Tillman
*Assistant Examiner*—Thomas De Benedictis
*Attorney, Agent, or Firm*—Merriam, Marshall, Shapiro & Klose

[57] ABSTRACT

Means and method for preparing a polymerized resin dental restorative material. The polymerizable mixture is mixed on the surface of a substrate having a controlled removable layer of a suitable catalyst, incorporating into the mixture an amount of catalyst controlled by the area of the substrate over which the mixing is effected.

8 Claims, No Drawings

PREPARATION OF DENTAL RESTORATIVE FILLING MATERIALS

This is a continuation-in-part of our pending application Ser. No. 231,736, filed Mar. 3, 1972 and now abandoned.

The present invention relates generally to the polymerization of one or more monomers by precoating the surface of a disposable mixing pad with a polymerization catalyst and mixing said monomer(s) thereon, utilizing a lesser or greater area of said disposable mixing pad in order to control the concentration of catalyst introduced into the reaction mixture and hence the rate of polymerization. More specifically, the present invention relates to a novel method for catalyzing a reaction of resinous binders used along with an inorganic filler to prepare dental restorative filling materials, and to a unitary material pack containing a catalyst-coated mixing pad or the like and a polymerizable component, with means to prevent premature contact between the catalyst and the polymerizable component.

The prior art discloses a number of composite resin systems which have in a number of variations provided the dental profession with excellent restorative filling materials. U.S. Pat. No. 3,066,112 to Bowen discloses the basic elements of one such system.

The system disclosed in that patent consists primarily of two components: (a) a finely divided inorganic filler, which may be fused or amorphous quartz, borosilicate or other glass, or other silicates or mixtures of these, and which represents about 70% by weight of the final mixture; and (b) a resinous binder, which usually comprises about 30% of the mixture. Bowen's system employs as a suitable resin binder, the reaction product of bisphenol A and glycidyl methacrylate, referred to hereinafter as BIS-GMA.

Because of the high viscosity of the components of BIS-GMA, a second monomeric material may be used as a diluent in the reaction mixture. A dimethacrylate, such as ethylene glycol dimethacrylate, can be used for this purpose. Thus, when the resinous binder is cured, it will be a copolymer of BIS-GMA and ethylene glycol dimethacrylate.

To induce polymerization, a free radical generating system, such as that provided by the combination of an organic peroxide catalyst and an aromatic tertiary amine accelerator, is utilized. Benzoyl peroxide and dimethyl paratoluidine are typical of suitable materials for this purpose.

In the prior art, several other variations in the system disclosed in the Bowen patent have been suggested or employed. For example, the inorganic filler may be treated with a bonding agent such as vinyl silane, which acts to increase the fixation of the resinous binder to the inorganic filler. Some of the problems facing the formulator of such a system include the balancing of all components to give maximum strength, hardness, abrasion resistance, minimal pulp irritation, solubility, water absorption and desirable translucency and shade.

In variations of Bowen's system, three types of formulations and methods of packaging have been used:

A. A two-paste system;
B. A paste-powder system; and
C. A paste-liquid system.

The two-paste system uses a "universal" paste, which contains an aromatic tertiary amine accelerator, and a "catalyst" paste, which contains an organic peroxide, both of which contain filler and binder in the desired proportions. This system has the advantage that the ratio of resinous binder to the organic filler remains constant irrespective of the quantities of the two pastes which are mixed. A disadvantage, however, of this type of system is that it has a limited shelf life unless kept under refrigeration, because the peroxide will slowly catalyze the polymerization of the monomers in the "catalyst" paste.

The paste-powder system uses a paste which contains a relatively high percentage of organic binder, and a relatively low percentage of inorganic filler, and an aromatic tertiary amine accelerator. The powder consists of additional filler and solid peroxide catalyst. No refrigeration is required because the peroxide is not, prior to use, in contact with polymerizable monomeric substances. However, a disadvantage of this approach is that the ultimate composition of the mix may vary, depending upon the amounts of paste and powder used in making the mixture. Inconsistent ratios of paste to powder will, of course, result in undesirable variations in the physical properties of the resulting composite.

The paste-liquid system uses a paste which contains all components except the peroxide. Then, as a separately packaged component, the peroxide in the form of a liquid or solution is added to the paste by means of a small hypodermic syringe. The advantage of this sytem is that it does not require refrigeration and the ratio of organic binder to inorganic filler remains constant. However, a disadvantage of this system is the fact that a liquid peroxide is required, or, if a solid peroxide such as benzoyl peroxide is to be used, then it must be dissolved in a solvent. Under typical circumstances, the use of a solvent is usually undesirable since it results in a final composite of generally poorer physical properties.

The present invention considerably reduces the problems associated with the formulation of such prior art systems by providing one component, typically a paste, containing all of the needed ingredients of the system except the catalyst, and a second component comprising a substrate on which is deposited a controlled, removable layer of catalyst. For use, the paste is deposited and mixed on the substrate. The catalyst is incorporated into the reaction mixture during the mixing in a concentration determined by the area of the substrate which is brought into contact with the mixture.

For convenience in use, the present invention can be embodied in a unitary package or pack containing the materials used in preparing the dental restorative material. Such a pack can contain a supply of the paste-like phase, a number of catalyst-coated substrate sheets, preferably in the form of a pad, and means for preventing premature contact between the catalyst and the polymerizable component. Such contact-preventing means can comprise separate, sealed containers for the paste-like phase and/or the substrate, or partitions in the pack which function for this purpose.

To prepare the substrate used in such a pack, in a preferred embodiment of the present invention a controlled layer of organic peroxide is deposited on the surfaces of the sheets of a paper mixing pad usually used by dentists for preparing multicomponent mixtures. The other components are formulated in their correct proportions into a single paste which is carried in the pack in such a manner as to prevent contact with the coated substrate, until placed thereon by the dentist. The paste employed does not require refrigeration and has excellent shelf life. In addition, the paste is easy to work with, being quite viscous but not too flowable under normal conditions. Since the dentist is already accustomed to the use of such a paper mixing pad, this system introduces no new steps foreign to his regular routine. The composition of the paste remains constant and the dentist can easily control the rate of curing or hardening of the composite material by the amount of surface area of the mixing pad that he uses in the activation of the material. In addition to the fact that the proportions of the composite material are automatically controlled and the system is very easy to use, the present invention has the further advantage that no time is wasted in measuring components.

The mixing pad or other substrate employed in the present invention can comprise any of a plurality of disposable substrates or sheets, e.g., woven, nonwoven, and spun bonded films, such as DuPont Tyvek, a shredded, spun bonded polyethylene; plastic sheet material such as cellophane; polyethylene; cellulose acetate; polyester sheet such as Mylar; and a variety of papers of different types. The papers which can be used include those which are coated or uncoated, parchmentized, plain or embossed, smooth or perforated with minute pinholes.

Two particularly useful sheet materials for purposes of the invention are 80 pound white "Sirocco" embossed enameled paper, and a filled, extruded, high-density polyethylene sheeting of 80 pound weight which has been formulated with ultraviolet light absorbers to prevent embrittlement upon exposure to light and which has been surface treated with corona discharge to increase absorption ("AcroArt", available from Mead Corporation, Mead Papers Division, Dayton, Ohio).

Any peroxide can be used in the invention which reacts with the accelerator component of the composite paste to give free radicals, which cause the polymerization of the monomeric components of the composition. The peroxide is deposited on the substrate or alternatively used in solution to impregnate the substrate, which is then dried. The peroxide should be stable on long storage at room temperature and have the proper order of reactivity to give an appropriate hardening time to the filling material. Benzoyl peroxide is an example of a peroxide having suitable properties. Other examples will be apparent to those skilled in the art.

When solutions of the organic peroxide are used to impregnate the substrate, it is preferred to use a solvent in which the peroxide dissolves to at least 1% by weight. The solvent used should be non-reactive toward the peroxide and should possess sufficient volatility to evaporate readily. Acetone is a preferred solvent, although several other solvents are also suitable, such as alcohols; amides, such as dimethyl formamide; chlorinated solvents; esters; ethers; hydrocarbons, aromatic or aliphatic; and ketones.

Although a solution of a solid peroxide, such as benzoyl peroxide, can be impregnated into a substrate such as paper without the use of a binder, the peroxide tends to lie loosely on the surface and thus is easily dislodged. It is therefore generally desirable to include in the peroxide solution a film former, which increases the retention of the peroxide to the paper. Acrylic resins, such as methyl methacrylate polymer or butyl methacrylate polymer, polystyrene, coumarone-indene, or liquid epoxy resins are suitable for such use. ERL-4221, a liquid epoxy resin available from Union Carbide Corp., is a preferred film former for this purpose. Good results can be obtained by using approximately equal weight weights of binder and benzoyl peroxide in the peroxide solution.

Alternatively, benzoyl peroxide can be applied to the substrate by suspending it in aqueous solutions of water soluble gums such as gum tragacanth, sodium alginate, carboxy methyl cellulose, and the like. This method, however, gives poorer results than the use of a film former as described above.

Still another method for applying the peroxide comprises applying a solution of sodium silicate to the substrate, which is then dipped into a solution of the peroxide in acetone before the sodium silicate solution has completely dried. This method appears simultaneously to gel the sodium silicate solution and also to imbed the peroxide in the surface of the film. The peroxide is held sufficiently firmly that the substrate can be handled without the loss of the peroxide, yet it is still available when the composite is mixed on the substrate by spatulation.

There are various methods of preparing the preferred embodiment of substrate, using benzoyl peroxide and ERL-4221 epoxy resin in acetone solution for application to embossed enameled paper. One or more drops of the solution can be placed in the center of a small sheet, e.g., 2 inches by 2 inches square. The solvent will evaporate leaving the catalyst affixed to the paper, yet still removable on spatulation of the paste-like phase thereon. It has been found, however, that as the acetone evaporates the solids are not deposited evenly but tend to form a ring around the periphery of the wetted area. Alternatively, a stripe can be rolled or painted across the paper from side to side. Although this is a satisfactory method of application, it is preferred to paint two stripes at right angles to each other, depositing the highest concentration of peroxide in the center of the pad. This method is less wasteful of reagents since the mixing is generally done in the center of the mixing pad. The solution can also be applied to the paper by dipping the paper in sheet or strip form into the solution and then hanging the strip to dry. This is the preferred method since the paper is coated uniformly, the rate at which the benzoyl peroxide is released as composite is mixed on the surface is excellent, and the dried sheet or strip can easily be cut into individual mixing pads.

The invention is illustrated by the following example.

EXAMPLE

A solution of 800 grams acetone, 100 grams benzoyl peroxide, and 100 grams epoxy resin (ERL-4221) is prepared. Strips of 80 pound white "Sirocco" embossed enameled paper, 12 inches by 36 inches, are thoroughly wetted in the solution, and then hung in a clean room to dry. The thoroughly dried paper is cut and assembled in a block of 50 sheets, which is backed with white 54 point board.

A composite "universal" paste especially suitable for dental restorative filling materials is prepared by mixing 86 parts by weight of BIS-GMA, 1 part dimethyl paratoluidine, and 13 parts ethylene glycol dimethacrylate. To 100 parts of this viscous mixture, 300 parts of silane-treated 200 mesh crystalline quartz is added.

In typical use, about 0.25 grams of the paste is placed on a sheet of the prepared mixing pad and spatulated for about 25 seconds, at about 1 stroke per second, using a pad area of about ¾ inch in diameter. The product so prepared will remain workable for approximately 2 minutes and will harden completely in approximately 7 minutes. The workable time may be increased by less mixing or by mixing over a smaller area, thus incorporating less catalyst in the composite.

The foregoing detailed description has been given for clearness of understanding only, and no unnecessary limitations should be understood therefrom, as modifications will be obvious to those skilled in the art.

What is claimed is:

1. A unitary dental restorative material pack comprising:
   a paste-like phase containing a polymerizable component comprising the reaction product of a bisphenol and a glycidyl acrylate or methacrylate;
   a sheet-like substrate carrying on its surface a controlled removable layer of a solid organic peroxide catalyst for the polymerization of said polymerizable component;
   the pack having means to prevent premature contact between said catalyst and said polymerizable components;
   said catalyst being available for incorporation into said paste-like phase, in sufficient quantity to catalyze the polymerization of said polymerizable component, on spatulation of said paste-like phase on the surface of said substrate.

2. The pack of claim 1, wherein said paste-like phase includes a finely divided inorganic filler and an aromatic tertiary amine accelerator for said catalyst, the reaction between said accelerator and said catalyst on spatulation of said paste-like phase on said substrate generating free radicals for the polymerization of said polymerizable component.

3. The pack of claim 2, in which said polymerizable component comprises the reaction product of bisphenol A and glycidyl methacrylate, said accelerator is dimethyl paratoluidine, said catalyst is benzoyl peroxide, and said filler is crystalline quartz.

4. The pack of claim 3 in which said polymerizable component contains ethylene glycol dimethacrylate as an additional monomer.

5. The method of preparing a dental restorative filling material comprising the steps of:
   preparing a paste-like component containing a polymerizable material comprising the reaction product of a bisphenol and a glycidyl acrylate or methacrylate, a finely divided inorganic filler material, and an aromatic tertiary amine accelerator for the polymerization of said polymerizable material;
   providing on a sheet-like substrate a controlled removable surface layer of a solid organic peroxide catalyst for the polymerization of said polymerizable material, said catalyst layer being sufficiently adherent to said substrate to withstand normal handling, while still being available for incorporation into said paste-like component by spatulation thereof;
   depositing said paste-like component onto said substrate; and
   spatulating said paste-like component over a limited area of said substrate, whereby there is incorporated into said component a sufficient quantity of said catalyst to coact with said accelerator for the polymerization of said polymerizable material.

6. The method of claim 5, wherein said catalyst is deposited on said substrate by impregnating said substrate with a solution of said catalyst and drying.

7. The method of claim 6, wherein said solution also contains a film-forming resin.

8. The method of claim 5 in which the rate of polymerization of said polymerizable material is controlled by controlling the size of the area of said substrate over which the material is spatulated.

* * * * *